INFORMATION HANDLING APPARATUS INCLUDING INSTRUCTION SUPPRESSION MEANS

Filed Nov. 7, 1962 2 Sheets-Sheet 1

INVENTOR.
BERNARD KEITH BETZ
BY [signature]
ATTORNEY

INVENTOR
BERNARD KEITH BETZ
BY [signature]
ATTORNEY

United States Patent Office 3,268,873

Patented August 23, 1966

3,268,873
INFORMATION HANDLING APPARATUS INCLUDING INSTRUCTION SUPPRESSION MEANS

Bernard K. Betz, Hopkins, Minn., assignor to Honeywell Inc., a corporation of Delaware Filed Nov. 7, 1962, Ser. No. 235,995
11 Claims. (Cl. 340—172.5)

Figure 1:
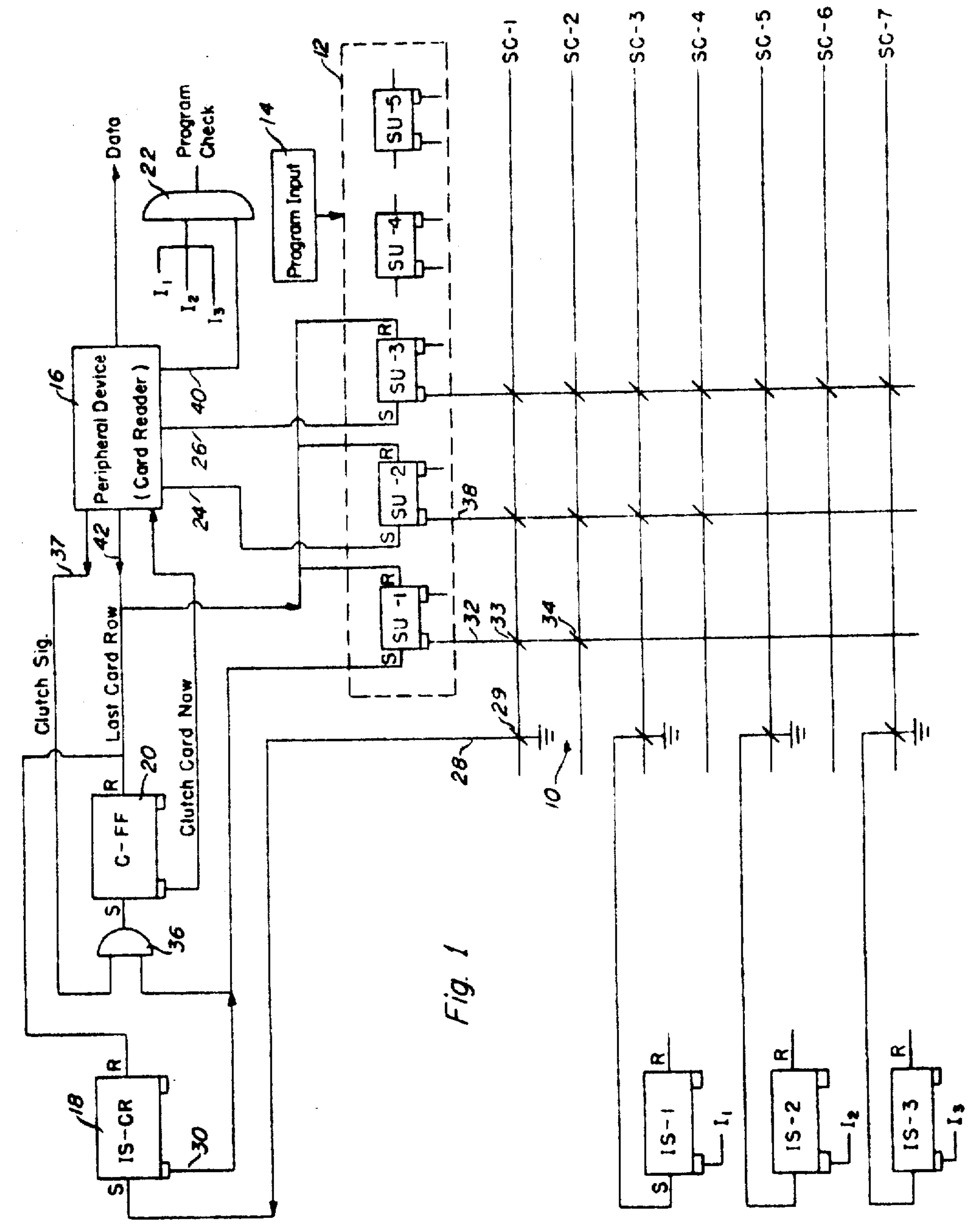

A general object of the present invention is to provide a new and improved programmed information handling apparatus of a type embodying an automatic control circuit which enables a user to program the operation of the apparatus for maximum efficiency when an electro-mechanical peripheral device is connected thereto. More specifically, the present invention is concerned with a new and improved information handling apparatus of the programmed data processing type which is characterized by its automatic control functions which assures, that when a peripheral device of the electro-mechanical type is called upon to communicate with the central processor portion of the data processor, the time required to condition the device to perform as intended is made available for effective program use by the central processor until such time as the associated peripheral device is actually in a condition ready to communicate.

Present-day data processing systems are generally made up of a central processor surrounded by various types of peripheral devices which serve as communicating links between the central processor and outside suorces. The central processor of the data processor will generally be of the stored program type which will include high-speed electronic arithmetic circuits, high-speed digital storage circuits, and interconnecting logical circuits which enable the processor to manipulate the data in accordance with a prearranged program which is also generally stored within a central processor. These central processors are capable of carrying out many thousands of operations per second. The peripheral devices which are normally associated with this type of processor are generally of the electro-mechanical type whose operating speeds are measured in terms of milliseconds rather than the microsecond speeds generally associated with the central processor.

It will be apparent that if the central processor becomes tied up, or effectively stalled, each time a program order calling for a peripheral device becomes active, valuable data processing time will be lost. It has been the practice heretofore in some types of data processing systems to have the programmer, who organizes the schedule of operations to be performed, to arrange his program so that once a peripheral device was called into operation, he could plan on using a certain number of program orders immediately thereafter knowing that there was a finite time available for additional central processor operation. The rules associated with such a manual programming restriction are of necessity very restrictive and tend to impede or otherwise render ineffective the over-all efficient operation of the data processing system.

In accordance with the teachings of the present invention, automatic means have been provided for ensuring that a central processor may be used to optimum advantage with a peripheral device without undue amounts of time being lost while the central processor might otherwise be waiting for a peripheral device to become effective. This has been accomplished, in accordance with the teachings of the present invention, by providing a facility which permits certain types of control orders or program orders to be performed once the peripheral device order has been selected and which will then suppress the selection of other types of orders whose time lengths of execution might interfere with the operation of the peripheral device when it becomes effective to do its intended function.

It is therefore a more specific object of the present invention to provide a new and improved apparatus for automatically permitting a series of program orders to be performed by a data processor following a peripheral device control order in combination with means for effectively suppressing the selection of certain program orders which might not be finished prior to the time that the associated peripheral device is fully conditioned to perform its intended operations.

The foregoing objectives of the present invention are achieved by interconnecting the peripheral device and the central processor so that the operational status of the peripheral device may be used to selectively suppress portions of a program selection sequencer. This will ensure that certain types of program orders which may be selected during a predetermined time interval will not be initiated at a time when the central processor will not be able to complete the order prior to the time the peripheral device becomes effective.

It is therefore still another more specific object of the present invention to provide a new and improved data processing system incorporating automatic control apparatus whereby a peripheral device is connected to a central processor to effectively suppress predetermined program control orders during a period of time immediately following the selection of a program order calling for operation of the peripheral device and the time that the peripheral device is ready to perform its intended function.

Another object of the invention is to provide a program sequencer which is used for initiating certain control functions within a central processor wherein the program sequencer is under the control of an associated peripheral device which serves to selectively suppress predetermined types of control orders in the central processor once an order calling for operation of the peripheral device has been initiated.

Still another object of the present invention is to provide a new and improved apparatus which will ensure the stopping of a central processor of a data processing system in the event that a control order is being performed during a time interval when a peripheral device is conditioned to begin its intended operation.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 2:
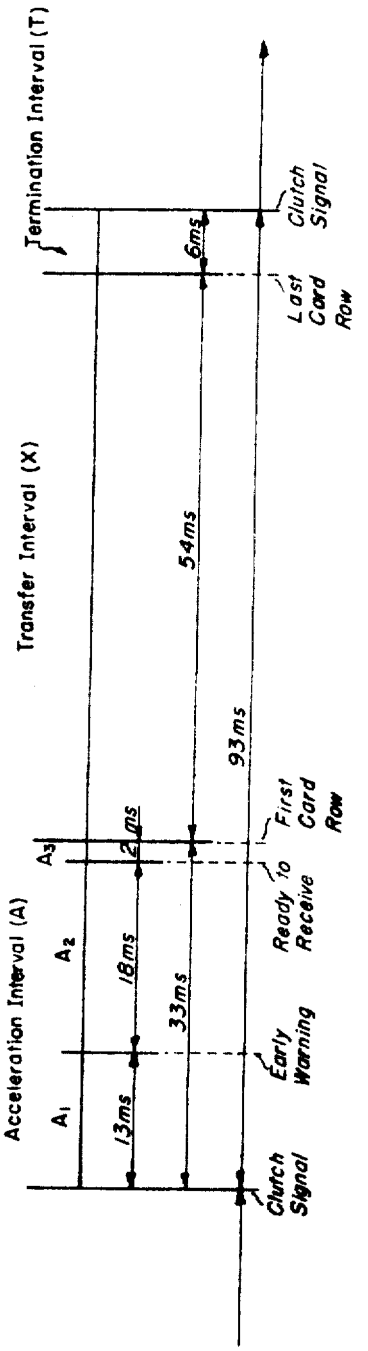

Of the drawings:

FIGURE 1 is a diagrammatic representation of the invention applied to a portion of a data processing system; and FIGURE 2 is a timing diagram associated with the particular embodiment illustrated and described in connection with FIGURE 1.

The apparatus of the present invetion, as illustrated in FIGURE 1, is designed to function as a part of an overall electronic data processing apparatus. A typical type of data processing apparatus that embodies the sequencing control apparatus of the type used herein will be found in the copending application of Joseph J. Eachus, bearing Serial Number 843,515, filed September 30, 1959. In this copending Eachus application, there is illustrated a saturable magnetic core type of sequencer which is so arranged that when a particular control order is applied to a plurality of input suppressing circuits, associated with the sequencer, a selected core, or cores, will become non-saturated such that a control signal may be coupled therethrough to effect the desired control action. Feedback from the core sequencer to the input circuits therefor are effective to cause the sequencer to step through a predetermined pattern to carry out certain types of logical functions to implement the selected order once it has been initiated by an appropriate set of input signals. The non-saturated state of seleced magnetic cores may be selectively modified in order to suppress the intended control action in the event that a condition exists within the system which must override the control action that might normally be initiated.

Referring next to FIGURE 1, the numeral 10 identifies a series of saturable magnetic cores such as might be incorporated in a magnetic core sequencer described in the aforementioned Eachus application. The sequencer 10 will be seen to be made up, in part, of a plurality of individual saturable cores SC–1 to SC–7. Each of these saturable cores will normally have threading the same as a drive winding, not shown, which upon the application of a drive signal, will cause the core to switch provided that the core is not saturated at the time that the drive signal is applied. The saturated or non-saturated state is normally controlled by a series of bistable flip-flops located in a suppression register identified in FIGURE 1 by the numeral 12. The flip-flops illustrated are identified as SU–1 through SU–5. The number of suppression flip-flops required in the register 12 will be dependent upon the number of magnetic cores in the sequencer 10 as well as the complexity of the logical control required for implementing the program orders to be performed. For selecting predetermined control functions, a normal program input mechanism 14 will supply set or reset signals for predetermined ones of the suppression flip-flops within the suppression register 12. These program input signals will normally be derived from an order word which is coded in binary language to define, by way of suitable binary codes, the types of orders which are to be performed by the associated data processing system.

All types of electronic data processing systems have some type of input or output device associated therewith and generally these devices are of an electro-mechanical nature. The device which is described in connection with the illustrated embodiment of the present invention is a card reader 16. A typical card reader will be one that is adapted to select a tabulating card, encoded with a suitable Hollerith code, from an input storage hopper and feed the card past an appropriate reading station wherein the holes previously punched in the card may be read. The resultant data representing the signals created by the card reading operation may then be transferred into the data processor for handling in the desired manner. The peripheral device, or card reader, 16 is here assumed to be one which will be activated by an external electrical signal and as it commences its operation it will, at predetermined time intervals, emit signals to indicate the status of readiness of the card reader insofar as performing its ultimate intended operation is concerned.

A pair of flip-flops 18 and 20 are associated with the controlling of the card reader 16. The flip-flop 18 is assumed to be an instruction-store flip-flop which will store the fact that a "card read" signal has been created within the sequencer 10 by way of signals emitted from the program input circuitry 14. The flip-flop 20 is a control flip-flop which coordinates the timing output signals of the card reader with respect to the instruction stored signal in flip-flop 18.

The apparatus of FIGURE 1 also includes a program check gate 22. This gate has, as one of its inputs, an output signal from the card reader 16. The other input to the gate 22 is a buffered input of signals from a series of instruction-store flip-flops IS–1 to IS–3, the latter of which are arranged to be activated if selected cores within the program sequencer 10 are activated at a particular instant.

Before considering the operation of the apparatus illustrated in FIGURE 1, reference should be made to FIGURE 2. In this figure, the timings associated with a typical type of card reader are illustrated. The card reader is assumed to be of the type which has the drive means therefor activated on a continuous basis so that it will be continuously in a readiness condition to perform a card-read operation as soon as a clutch signal has been received on an input signal line. The presence of the clutch signal signifies the beginning of a card read cycle. The card reader will commence to operate through a first acceleration interval $A_1$. Thirteen milliseconds after the clutch signal is received, an "early warning" signal will be emitted by the card reader 16 on an output line 24. Eighteen milliseconds thereafter, following a second acceleration interval $A_2$, a "ready-to-receive" signal will be emitted on an output signal line 26. Two milliseconds thereafter, following a third acceleration interval $A_3$, the first card row will be in the reading station and signals coded in the card will be at a point where they may be read and the data therefrom transferred. At this instant, a "first card row" signal will appear on output line 40. It will thus be apparent from this initial operation of the card reader that there is an acceleration interval A which is associated with the time required for picking the card from an input stack and feeding the card into position at the reading station so that the same may be read. The total time taken in this assumed acceleration interval A is indicated to be thirty-three milliseconds.

The time taken to transfer the card past the reading station from the first card row until the last card row has been sensed is fifty-four milliseconds. This time interval is referred to as the transfer interval X during which all levels of code punched in the punched card will have been appropriately read in the reading station and the data transferred into the associated data processor. Immediately following the reading of the last card in the card row, there will be a termination interval T which is assumed here to be of a six-millisecond duration. The total card cycle will then be seen to comprise a period of ninety-three milliseconds' duration.

In order to effect a continuous feeding of cards through the card reader, the instruction for each card read must be received from the sequencer at some time prior to the time that the "clutch signal" is emitted via the card reader. In the event that the card read instruction is not so sensed during the termination interval T, the apparatus will have to wait for a full card cycle of ninety-three milliseconds to pass before a card will be selected and read.

As discussed above, should a programmer desire to use the associated data processing system during the acceleration period of the card reader, he can perform a large number of operations between the time that the card read signal is initiated and the card reader is actually in a position to start delivering data. For example, in the event that the associated data processing system has its internal rated speed of operation of 20,000 "add" operations per second, the 33-millisecond period will be of sufficient length to carry out a total of 660 add orders. Obviously, with this additional potential capacity being idle during a card-read operation, the data processing system would not be operating efficiently and the resultant cost of any particular data processing operation might be increased considerably.

While it may be possible for a programmer to effectively count the number of orders that may be performed with respect to the available acceleration time and determine what program orders could be performed during this time, the problem becomes more complex when certain types of control orders of variable time length are selected. For example, a multiply order or a divide order will not necessarily be completed in a fixed time interval for the reason that the time interval required to perform a particular multiply or divide operation varies in accordance with the operands associated with that particular operation. Further, transfer orders of variable-length records may result in varying performance times for certain types of control orders. In the interests of minimizing the complexity of programming to the using programmer, the present apparatus is so arranged that the programmer may lay out his program in the manner in which he determines is most efficient for the particular problem at hand. In the event that the orders that he desires be performed cannot be performed within the limits established during the acceleration interval illustrated in FIGURE 2, these orders will be suppressed and the apparatus will carry out its normal card-reading operation and then return to the desired order to proceed with the program as the programmer intends. This type of operation will be more apparent upon considering the over-all operation of the apparatus of FIGURE 1 as it relates to the timing illustrated in FIGURE 2.

Considering the detailed operation of FIGURE 1, it is first assumed that the data processing apparatus is in the middle of a program and that the control order coming up in a predetermined sequence is a card-read order. The card-read code will be appropriately interpreted by way of the program input 14 and the suppression register 12 will have the flip-flops thereof appropriately set or reset so that the saturable cores SC–1 will not be saturated. When a drive signal is applied to the saturable core SC–1, this core will switch and a signal will be coupled through an appropriate sense winding 28 which is coupled to the core at 29, as illustrated by a slant line intersecting the core SC–1 and the line 28. The sense winding 28 leads to the set input of the instruction-store flip-flop 18 which stores the card read signal. The setting of the flip-flop 18 will cause the output lines 30 to become active and this output line will be seen to be connected to the set input of the suppression flip-flop SU–1. The setting of this particular suppressor flip-flop will activate its output line 32. This particular output line 32 is shown coupled to the saturable cores SC–1 and SC–2 at 33 and 34 respectively, so that both of the cores SC–1 and SC–2 will now be saturated by the signal appearing on the line 32. The effect of this is to prevent the subsequent selection of a further card-reader which would normally effect the switching of the core SC–1 or a further order, such as a card-punch order, which might normally cause the switching of the saturable core SC–2.

The output of the flip-flop 18 is also applied to an input gate 36 to condition this gate for activation as soon as the next "clutch signal" is received at the start of the normal card cycle illustrated in FIGURE 2. This "clutch signal" will appear on a line 37 leading to the gate 36 and upon its occurrence, with the concurrent appearance of the signal from the line 30, a signal will pass through the gate 36 to set the control flip-flop 20. At this time, a "clutch-car signal" will be sent to the card reader and this will initiate the picking of the next card from the input card hopper and the acceleration operation will now be underway.

As illustrated in FIGURE 2, the first signal emitted after the "clutch signal" is the "early warning signal" which appears on the line 24 and the "early warning signal" will be effective to set the suppression flip-flop SU–2. The flip-flop SU–2 is shown to have its assertive output signal on line 38 coupled to the saturable cores SC–1 through SC–4. This will mean that the additional cores SC–3 and SC–4 will now be suppressed so that a further set of control orders will be inhibited in the event that they should come up in this normal program sequence after the card read order. This type of order might well be a multiply order or a divide order. In other words, should either of these orders come up after the initial acceleration period $A_1$, shown in FIGURE 2, the orders must be suppressed as the data processor might not have sufficient time to carry out the order before the card reader will be in condition to actually start the transfer of data.

As the card reader proceeds in its operation, it will next emit a further "ready-to-receive signal" on line 26. The effect of this will be to render ineffective the selection of any further control orders in the central processor to ensure that the apparatus will not initiate any order which might interfere with the transfer of data by the card reader.

The program check gate 22 serves to check if some particular control order of unusual length was initiated, and has not been completed prior to the time that the "first card row signal" appears, on the output line 40. Thus, if any one of the instruction-stored flip-flops IS–1 to IS–3 should be in a set state, their effective outputs $I_1$ to $I_3$, buffered together to the input of the gate 22, will be effective to cause a "program-check signal" to be emitted and this "program-check signal" may either be used to signal the operator that an error condition has been created or may be used to automatically stop the data processing system.

As soon as the last card row has been read, a signal appears on the line 42 and this signal is applied to the reset inputs of the instruction-stored flip-flop 18 as well as the control flip-flop 20. The reset signal is also applied to the suppression flip-flops SU–1 to SU–3 so that the suppress conditions created during the acceleration time of the card-read operation will now be eliminated so that the apparatus will be free to perform any desired control order that may next occur in the program sequence.

It will be readily apparent from the foregoing description that the principles of the present invention may be considered applicable to many types of peripheral devices that may be associated with the central processor, whether it be a card reader, a printer, tape drive, or other device having an inherent delay period required prior to the time that a particular control order can be carried out. It will also be apparent that the types of acceleration signals that may be associated with any such peripheral device will vary in accordance with the nature of the device.

While, in accordance with the provisions of the statutes, there has been illustrated and described the best forms of the invention known, it will be apparent to those skilled in the art that changes may be made in the apparatus described without departing from the spirit of the invention as set forth in the appended claims and, in some cases, certain features of the invention may be used to advantage without a corresponding use of other features.

Having now described the invention, what is claimed as new and novel and for which it is desired to secure by Letters Patent is:

1. Control apparatus for a programmed data processor comprising a peripheral device requiring a finite time to become operative and having a control signal input, a peripheral device control order sensing and storage means, means including said storage means connected to said control signal input of said peripheral device and thereby activate said device to effect a predetermined operation thereof, a control order selecting means, and means including said peripheral device connected to said control order selecting means to suppress the further selection of predetermined orders by said control order selecting means while permitting the selection of other orders during the period said peripheral device is being readied for operation.

2. Apparatus for controlling a programmed data processor comprising a program sequencer, said sequencer having a plurality of separate outputs each of which is adapted to be activated to identify a separate program order, sensing means connected to be activated by a first output from one of said sequencers to initiate a programmed operation whose effect on said data processor will occur a finite time after said sensing means becomes activated, means connected to activate selected ones of said sequencer outputs other than said one output, timing means connected to be controlled by said sensing means to produce a timing signal during said finite time, and means connecting said timing means to suppress the output of selected ones of said outputs upon the occurrence of said timing signal.

3. Control apparatus for a programmed data processor comprising a continuously operating peripheral device requiring a finite time after activation to become effective to communicate with said data processor, a control signal input connected to said device, a peripheral device control order sensing and storage means, means including said storage means connected to said control signal input of said peripheral device to activate said device, a multiple program order selecting means having an output connected to said storage means and control means including said peripheral device connected to said order selecting means to suppress the further selection of predetermined orders while permitting the selection of other orders by said selecting means.

4. Apparatus as defined in claim 3 wherein said control means comprises a pair of outputs from said peripheral device, said outputs having time-spaced signals thereon to effect a selective suppression of the selection of predetermined orders by said selecting means.

5. Control apparatus for a programmed data processor comprising a peripheral device requiring a finite time to become operative and having a control signal input, a peripheral device control order sensing and storage means, means including said storage means connected to said control signal input of said peripheral device to activate said device to effect a predetermined operation of said peripheral device, a control order selecting means, and means including said storage means when operative to activate said device connected to said order selecting means to suppress the further selection of predetermined orders by said selecting means while permitting the selection of other orders.

6. Apparatus for controlling a programmed data processor comprising a program sequencer, said sequencer having a plurality of separate outputs each of which is adapted to be activated to identify a separate program order, sensing means connected to be activated by a first output from one of said sequencer outputs to initiate a programmed operation whose effect on said data processor will occur a finite time after said sensing means becomes activated, means connecting said sensing means to said sequencer to suppress the further selection of an order of the type activating said sensing means, means connected to activate selected ones of said sequencer outputs other than said one output, timing means connected to be controlled by said sensing means to produce a timing signal during said finite time, and means connecting said timing means to suppress the output of further selected ones of said outputs upon the occurrence of said timing signal.

7. Control apparatus for use with a programmed data processor comprising a peripheral document reading device which is connected to communicate data from a document to said data processor, said peripheral device having an activating input signal line and a plurality of output operative condition indicating lines including a first line which indicates when the device is ready to be activated to feed a document and a second line which indicates data is ready to be transferred to said data processor, a program sequencer having a plurality of separate outputs for indicating the program orders to be performed, storage means connected to said sequencer to indicate the presence of an order directing activation of said peripheral device, means including a signal from said first line connecting said storage means to said activating input signal line, and means connecting said second line to said program sequencer to suppreess the outputs thereof when said output line is activated to indicate an operative condition of said peripheral device.

8. Control apparatus for use with a programmed data processor comprising a peripheral device which is connected to communicate data with said data processor, said peripheral device having an activating input signal line and an output operative condition indicating line, a program sequencer having a plurality of separate outputs for indicating the program orders to be performed, storage means connected to said sequence and being adapted to be set to indicate the presence of a peripheral device activating order, means connecting a signal indicative of the set state of said storage means to said activating input signal line, means connecting said output line to said program sequencer to suppress selected outputs thereof when said out put line is activated to indicate an operative condition of said peripheral device, and means including a signal from said peripheral device connected to said storage means to reset said storage means upon the completion of the operation of said peripheral device.

9. Apparatus as defined in claim 8 wherein said program sequencer comprises a plurality of separate saturable cores having said output line coupled thereto to saturate selected ones of said cores to suppress the selection of outputs from said sequencer.

10. A programmed data processing apparatus comprising a program sequencer having a predetermined fixed logic included therein, said sequencer having a plurality of separate elements each of which is adapted to be activated to identify a separate program order, means connected to said logic to activate selected ones of said sequencer elements, and automatically operative system condition sensing means connected to said separate elements to suppress selected ones of said selected elements, said last-named sensing means being responsive to unprogrammed machine generated signals indicative of a particular system condition.

11. In combination, a programmed data processor, a peripheral device connected to said data processor, a sequencer associated with said data processor and operatively connected to said peripheral device, said sequencer having a plurality of separate outputs each of which is adapted to be activated to identify a separate program order, storage means connected to said sequencer and being adapted to be set to indicate the presence of a peripheral device activating order, and automatically operative system condition sensing means connected to said storage means to suppress certain ones of said peripheral device activating orders.

References Cited by the Examiner

UNITED STATES PATENTS

| | | | |
|---|---|---|---|
| 3,029,414 | 4/1962 | Schrimpf | 340—172.5 |
| 3,061,192 | 10/1962 | Terzian | 340—172.5 |
| 3,181,121 | 4/1965 | Losch et al. | 340—172.5 |
| 3,208,048 | 9/1965 | Kilburn et al. | 340—172.5 |

ROBERT C. BAILEY, *Primary Examiner.*

P. J. HENON, *Assistant Examiner.*